(12) United States Patent
Merhar (10) Patent No.: US 7,550,056 B1
(45) Date of Patent: Jun. 23, 2009

(54) SYSTEM AND METHOD FOR MANUFACTURING A BRAKE SHOE

(75) Inventor: Gerald E. Merhar, Ooltewah, TN (US)

(73) Assignee: Honeywell International Inc., Morristown, NJ (US)

( * ) Notice: Subject to any disclaimer, the term of this patent is extended or adjusted under 35 U.S.C. 154(b) by 609 days.

(21) Appl. No.: 11/212,025

(22) Filed: Aug. 25, 2005

Related U.S. Application Data (60) Provisional application No. 60/604,770, filed on Aug. 26, 2004.

(51) Int. Cl.
*B32B 37/00* (2006.01)

(52) U.S. Cl. ............... 156/307.3; 156/307.7; 156/311; 156/312

(58) Field of Classification Search ............... 156/60, 156/3–7.3, 307.7, 311, 312, 307.3
See application file for complete search history.

(56) References Cited

U.S. PATENT DOCUMENTS 5,595,266 A * 1/1997 Cecere ............... 188/251 A
6,284,074 B1 * 9/2001 Braund et al. ............... 156/64

FOREIGN PATENT DOCUMENTS

DE 2330250 A1 * 1/1975
GB 2001582 * 2/1979

* cited by examiner

*Primary Examiner*—Jeff H Aftergut
(74) *Attorney, Agent, or Firm*—Cantor Colburn LLP.

(57) ABSTRACT

A method for manufacturing a brake shoe in accordance with an exemplary embodiment is provided. The method includes disposing an adhesive layer on a brake shoe carrier. The method further includes moving a friction material against the adhesive layer on the brake shoe carrier. The method further includes heating the adhesive layer to a first predetermined temperature using a first device to bond the friction material to the brake shoe carrier without substantially curing the friction material. Finally, the method includes substantially curing the friction material disposed on the brake shoe carrier by heating the friction material to a second predetermined temperature using a second device remote from the first device to form the brake shoe.

17 Claims, 7 Drawing Sheets

FIRST INDEXING POSITION
*Figure 7*

SECOND INDEXING POSITION
*Figure 8*

THIRD INDEXING POSITION
*Figure 9*

FORTH INDEXING POSITION
*Figure 10*

FIFTH INDEXING POSITION
*Figure 11*

SYSTEM AND METHOD FOR MANUFACTURING A BRAKE SHOE

CROSS REFERENCE TO RELATED APPLICATIONS

This application claims the benefit of U.S. Provisional Patent Application Ser. No. 60/604,770 filed Aug. 26, 2004, the contents of which are incorporated herein by reference thereto.

TECHNICAL FIELD

The present invention relates to a system and a method for manufacturing a brake shoe.

BACKGROUND

Drum brakes have two components, a shoe and a lining. There are three attachment methods used today to secure the lining to the shoe these methods are commonly referred to as riveted, bonded and molded. The molding process is commonly referred to as integrally molded or IM. The integrally molded process used today molds the prepped shoe in a press, which is typically hot and the friction material is held at a pressure while the heat cures resins of the friction material and the adhesive located between the shoe and the friction material.

The length of time under at which the friction material is under pressure in the press and in order to completely cure the friction material is greater than 30 seconds and may be as long as 3-8 minutes or even longer. Moreover, certain high curing temperatures are required to be maintained during this process. Accordingly, the length of time to attach and completely cure the lining to the shoe impacts tooling costs, tooling lead times, throughput, and capital requirements. Moreover, tooling costs also increase as the pieces per cycle increase. For example, integrally molded process costs depend on cure length times, required pressures and available tonnage in press, and area in press as well as required temperatures and availability of heat sources. Tooling lead times are based on the complexity of the part geometry, number of pieces per cycle and the number of tooling sets required to support a part number. Throughput is impacted by much of the same as tooling, material pressure requirements, press tonnage capacity and area in press. Also, the number of presses may increase due to high pressure demands set by the materials used. Capital requirements increase due to support equipment needed in the pressing operations based on press size, capacity and cure length.

Accordingly, it is desirable to provide a system and method for manufacturing integrally molded drum brakes at an increased capacity while reducing capital costs.

SUMMARY OF THE INVENTION

A method for manufacturing a brake shoe in accordance with an exemplary embodiment is provided. The method includes disposing an adhesive layer on a brake shoe carrier. The method further includes moving a friction material member against the adhesive layer on the brake shoe carrier. The method further includes heating the adhesive layer to a first predetermined temperature using a first device to bond the friction material member to the brake shoe carrier without substantially curing the friction material member. Finally, the method includes substantially curing the friction material member disposed on the brake shoe carrier by heating the friction material member to a second predetermined temperature using a second device remote from the first device to form the brake shoe.

A system for manufacturing a brake shoe in accordance with another exemplary embodiment is provided. The system includes a moveable platform having a plurality of holders configured to support a plurality of brake shoe carriers, wherein each holder supports at least one brake shoe carrier and each brake shoe carrier having an adhesive layer disposed therein. The system further includes a pressing station disposed proximate the moveable platform, the pressing station is configured to receive at least one of the brake shoe carriers disposed on a holder and to move a friction material member against the adhesive layer on the brake shoe carrier. The pressing station is further configured to heat the adhesive layer to a first predetermined temperature to bond the friction material member to the brake shoe carrier without substantially curing the friction material member. Finally, the system includes a curing oven configured to substantially cure the friction material member disposed on the brake shoe carrier by heating the friction material member to a second predetermined temperature to form the brake shoe.

Also disclosed herein is a method for manufacturing a brake shoe. The method comprising: disposing an adhesive layer on a brake shoe carrier; disposing a friction material against the adhesive layer; heating the adhesive layer and the friction material to a first predetermined temperature; using a first device to bond the friction material to the brake shoe carrier without substantially curing the friction material; and substantially curing the friction material by heating the friction material member to a second predetermined temperature using a second device remote from the first device to form the brake shoe.

Also disclosed herein is a method for adhering a friction material to a brake shoe. The method comprising: disposing an adhesive layer on a plurality of brake shoe carriers; disposing the plurality of brake shoe carriers on a plurality of holders on a moveable platform wherein each of the plurality of brake shoe carriers are sequentially positioned below a mold assembly comprising an apparatus for disposing a discrete amount of friction material on each of the plurality of brake shoe carriers; adhering the discrete amount of friction material to each of the brake shoe carriers by heating the brake shoe carrier and applying a compressing force to the discrete amount of friction material without curing the discrete amount of friction material, wherein of the plurality of holders comprises a heating source and the apparatus provides the compressing force without a heating source; removing each of the plurality of brake shoe carriers from the movable platform after the discrete amount of friction material has been adhered thereto; and curing the discrete amount of friction material to each of the plurality of brake shoe carriers wherein a permanent bond is formed between the discrete amount of friction material and the brake shoe carrier, wherein the curing occurs at a location remote from the movable platform.

In accordance with an exemplary embodiment, a system for manufacturing a brake shoe is provided. The system comprising: a moveable platform having a plurality of holders configured to support a plurality of brake shoe carriers, each holder supporting at least one brake shoe carrier, each brake shoe carrier having an adhesive layer disposed therein; a pressing station disposed proximate the moveable platform, the pressing station configured to receive at least one of the brake shoe carriers disposed on a holder and to move a friction material against the adhesive layer on the brake shoe carrier, the pressing station further configured to apply a compression force to the friction material, wherein each of the plurality of holders are configured to heat the friction material and the adhesive layer to a first predetermined temperature to bond the friction material to the brake shoe carrier without substantially curing the friction material; and a curing oven configured to substantially cure the friction material disposed on the brake shoe carrier by heating the friction material to a second predetermined temperature to form the brake shoe, the curing oven being remote from the movable platform.

DETAILED DESCRIPTION OF EXEMPLARY EMBODIMENTS

Drum brakes include a brake shoe carrier with a friction material member bonded thereto. The brake shoe carrier is typically constructed of a steel material and the friction material member includes a binder and a fibrous reinforcement material. In order to bond the friction material member to the brake shoe carrier, adhesive bonding has been utilized. Prior to curing the friction material member, the friction material member has an unprocessed, "green," state consisting of fibrous reinforcement materials and an uncured thermosetting binder.

A heated press has been utilized to both cure an adhesive disposed between a brake shoe carrier and a friction material member and to cure the friction material member. A disadvantage of the heated press is that the press can only simultaneously cure the adhesive and the friction material member for a relatively small number of brake shoes due to required time periods for pressures and temperatures to cure the friction material. Thus and in order to increase the number of brake shoes manufactured during a giving cycle or time, the associated costs increase as additional heated presses are required. Accordingly, a manufacturing rate for producing brake shoes utilizing the heated press is relatively low.

Figure 1:
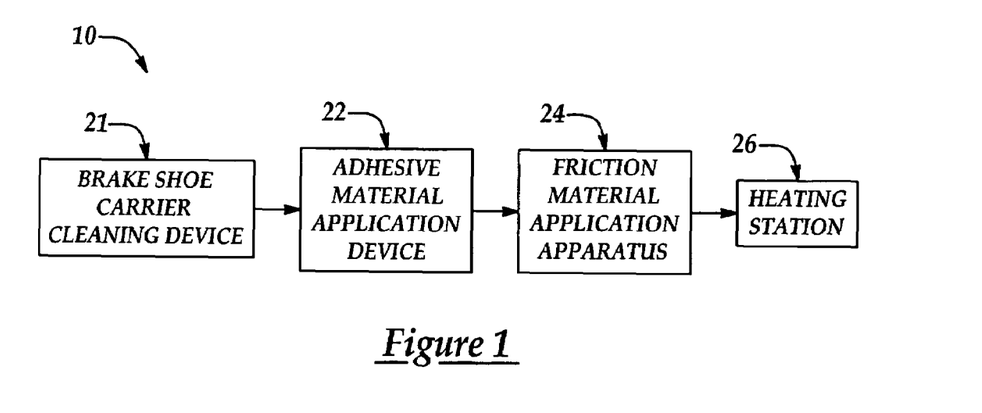
FIG. 1 is a schematic of a system for manufacturing brake shoes including an adhesive material application device, a friction material application apparatus, and a heating station in accordance with an exemplary embodiment.
Figure 2:
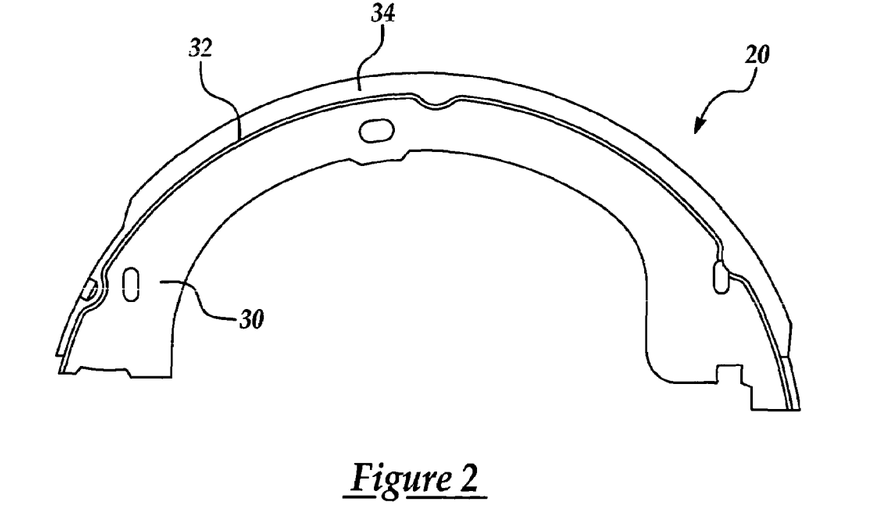
FIG. 2 is a cross sectional view of a brake shoe manufactured using the system of FIG. 1.

Referring to FIGS. 1 and 2, a system 10 for manufacturing brake shoes in accordance with an exemplary embodiment of the present invention is illustrated. In particular, the system is utilized for adhering a friction material 34 to a brake shoe carrier 30 in a short cycle process in order to ultimately form a brake shoe 20.

Molding the brake shoe in a short cycle process simplifies the molding process in many ways. One part/cycle is feasible due to high throughputs. In other words since the press is only used to mold the friction material about the brake shoe carrier and not completely cure the same the tooling costs are only a fraction of today's current hot press processes since only one part is needed to be tooled for and the press does not have to be a heated press. Moreover, and since the heating temperatures at the forming stage during the short cycle process are not as high as the heating temperatures required for curing, the short cycle process is considerably quicker when compared to integrally molding processes that completely cure the friction material at the pressing stage. In addition, the tooling design is simplified for only one part at a time therefore the time-to-market is significantly less. Also, engineering samples tooling can be used in production and tooling lead times are significantly less. Once again, tooling for one part is significantly less than that of two or more parts.

The process according to exemplary embodiments of the present invention is a short cycle process, the process allows the part to be pressed in less than 30 seconds and as short as one second since there is no requirement for complete curing during the pressing process. In accordance with an exemplary embodiment the required times of the short cycle process are typically less than 10 seconds. The short cycle process does not completely cure the material in the press but simply forms and attaches the uncured friction material to the shoe using an adhesive to hold the friction to the shoe while being cured later in an oven. Therefore, the required heating temperatures at the forming stage of the short cycle process are considerably lower than those required for completely curing the friction material. Moreover, and as will be discussed herein, no heat press is required as the source of heat, if required, will be provided by the holder holding the brake shoe carrier.

In accordance with an exemplary embodiment the short cycle process comprises a press; tooling; and materials. In order to perform the short cycle process of exemplary embodiments of the present invention a press of proper tonnage is required to mold the friction material and set up about a heat source, if required, which ultimately depends on the materials used (e.g., friction materials and adhesives). The materials comprise: brake shoes, selected friction materials and selected adhesives. The tooling comprises: a punch to form a radius under pressure; a die cavity used to contain the friction materials; and a shoe holder to hold shoe while pressing as well as provide a source of heat, if necessary.

In accordance with an exemplary embodiment the process can be briefly described as follows: prepare the shoe with the selected adhesive on the rim of the shoe (note: the adhesive may also be used as a dip to serve as a rust preventative on the shoe plate); select a friction material that lends itself to the short cycle process and has the desired performance criteria; place the shoe in a shoe holder and allow shoe to heat if necessary to proper temperature; locate a die box around shoe to create a mold cavity; add friction material to the mold cavity; apply a punch force to obtain necessary tonnage on part (e.g., friction material); perform any required degas to remove "bumps" from the friction material this step will ultimately depend upon the friction material requirements; remove punch and mold cavity away from the shoe and lining material; and remove the shoe with the friction material formed thereon and allow to the same to cure in oven at specified times and temperatures. Accordingly, the short cycle process of exemplary embodiments of the present invention allows for faster production of the brake shoes as the curing process has been removed from the process wherein the friction material is formed about the shoe plate.

In accordance with an exemplary embodiment, the brake shoe includes the brake shoe carrier, an adhesive material 32, and the friction material member 34. The brake shoe carrier 30 is constructed of steel and has a generally semi-circular, cross-sectional shape. The friction material member 34 has both a polymer binder and a fibrous reinforcement material and is configured to cover about three-quarters of an outer surface of the brake shoe carrier 30. In accordance with an exemplary embodiment, brake shoe carrier 30 is configured to be used a drum brake pad or in a drum brake system. The adhesive material 32 is disposed between the friction material member 34 and the brake shoe carrier 30 and is provided to bond the brake shoe carrier 30 and the friction material member 34. The adhesive material 32 is a resin or glue capable of bonding the friction material member 34 to the brake shoe carrier 30 when cured at a predetermined curing temperature. The system 10 includes a brake shoe carrier cleaning device 21, an adhesive material application device 22, a friction material application apparatus 24, and a heating station 26.

The brake shoe carrier cleaning device 21 is provided to remove an oil film and dust from surfaces of the brake shoe carrier 30. In one embodiment the cleaning device is a shot-blasting device. The shot-blasting device includes a rotatable impeller disposed within a housing. As the impeller rotates, the impeller contacts relatively small steel balls and urge the steel balls to strike the brake shoe carriers 30 thereby removing the oil film and dust disposed on the brake shoe carriers 30. After a predetermined cleaning period, the brake shoe carriers 30 are unloaded from the cleaning device 21 and are either manually or automatically moved to the adhesive application device 22. In an alternate embodiment, the device 21 could also utilize sand, plastic media, ceramic media, or other abrasives to clean the brake shoe carrier 30.

Figure 3:
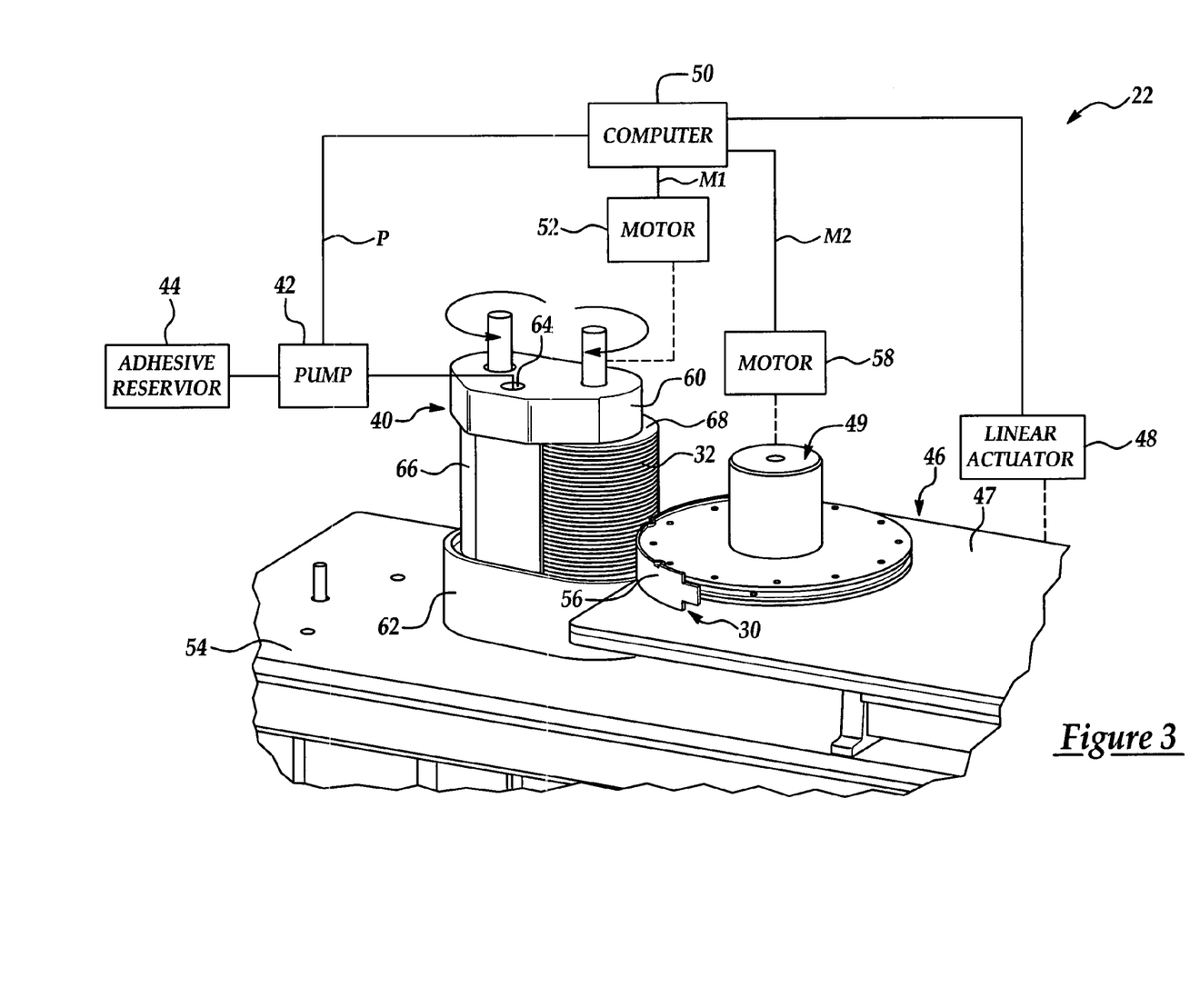
FIG. 3 is a perspective view of the adhesive material application device of FIG. 1.

Referring to FIGS. 2 and 3, the adhesive material application device 22 is provided to apply the adhesive material 32 to the brake shoe carrier 30. The adhesive material application device 22 includes an adhesive dispensing device 40, a pump 42, an adhesive reservoir 44, a feed plate 46, a linear actuator 48, a control computer 50, a motor 52, a table 54, and a feed plate motor 58.

The adhesive dispensing device 22 is provided to apply an adhesive on a surface of the brake shoe carrier 30. The adhesive dispensing device 40 includes a top plate 60, a bottom plate 62, and rollers 66, 68. The rollers 66, 68 are disposed between the plates 60 and 62 proximate one another. The roller 66, 68 are spaced apart from one another a predetermined distance to form a gap therebetween that defines a thickness of an adhesive that will be applied to the roller 68. The roller 68 is operably coupled to the motor 52 that rotates the roller 68 at a predetermined rotational speed. In particular, the motor rotates the roller 68 in response to a signal (M1) received from the control computer 50. As shown, the adhesive dispensing device 40 is disposed on the table 54.

The pump 42 is operably coupled between the adhesive reservoir 44 and the adhesive dispensing device 40. The pump 42 is provided to urge an adhesive material 32 from the adhesive reservoir 44 into an aperture 64 extending through the top plate 60 and further into the gap between the rollers 66, 68. The pump is further operably coupled to the control computer 50. The control computer 50 transmits a control signal (P) to the pump 42 that urges the pump 42 to supply the adhesive material 32 to the adhesive dispensing device 40.

The feed plate 46 is provided to move the brake shoe carrier 30 proximate the adhesive dispensing device 40 to allow an adhesive to be applied to the brake shoe carrier 30. The feed plate 46 is operably disposed on the table 54. The feed plate 46 includes a plate 47 and an attachment portion 49. The attachment portion 49 is disposed on the plate 47 and is configured to hold a brake shoe carrier 30 against the plate 47. The attachment portion 49 is operably coupled to the motor 58. The motor 58 is provided to rotate the brake shoe carrier 30 about 180 degrees about a centerpoint of the carrier 30 when the carrier 30 is proximate the adhesive dispensing device 40. The feed plate 46 rests on a slidable member (not shown) that allows the feed plate 46 to slide in an axial direction toward or away from the adhesive dispensing device 40. Further, the feed plate 46 is operably coupled to the linear actuator 48 that moves the feed plate from a first position for loading the brake shoe carrier 30 thereon to a second position adjacent the adhesive dispensing device 40 allowing the device 40 to apply the adhesive to a first surface 56 of the brake shoe carrier 30.

During operation of the adhesive application device 22, an operator or a loading device loads the brake shoe carrier 30 onto the feed plate 46. The operator or device secures the brake shoe carrier 30 using the attachment portion 49 so that a convex first surface 56 of the brake shoe carrier 30 extends out over the edge of the feed plate 46. The linear actuator 48 receives a signal from the control computer 50 to axially move the feed plate 46 adjacent the application roller 68 and induces the application roller 68 to dispense adhesive material 32 on the brake shoe carrier 30. Thereafter, the control computer 50 generates the control signal (M2) to induce the motor 58 to rotate the brake shoe carrier 30 about 180 degrees while contacting the application roller 68 to thereby coat the first surface 56 with the adhesive material 30. Thereafter, the control computer 50 induces the linear actuator 48 to move the feed plate 42 away from the device 40 to an unload position. At the unload position, an operator can remove the brake shoe carrier 30 from the feed plate 46. In an alternative embodiment, an automated process may be used when loading the brake shoe carrier 30 onto the feed plate 46 and when unloading the brake shoe carrier 30 from the feed plate 46.

The adhesive material application device 22 is an exemplary device for applying the adhesive material 32 to the brake shoe carrier 30. It should be noted, however, that other embodiments of device 22 could be utilized including: (i) an adhesive spraying system for spraying the adhesive on the carrier 30, and (ii) an immersion system for at least partially immersing the carrier 30 in a housing containing the adhesive material 32. Other contemplated devices include those that apply the adhesive material 32 to the friction material member 34 prior to the friction material member 34 being applied to the carrier 30.

Figure 4:
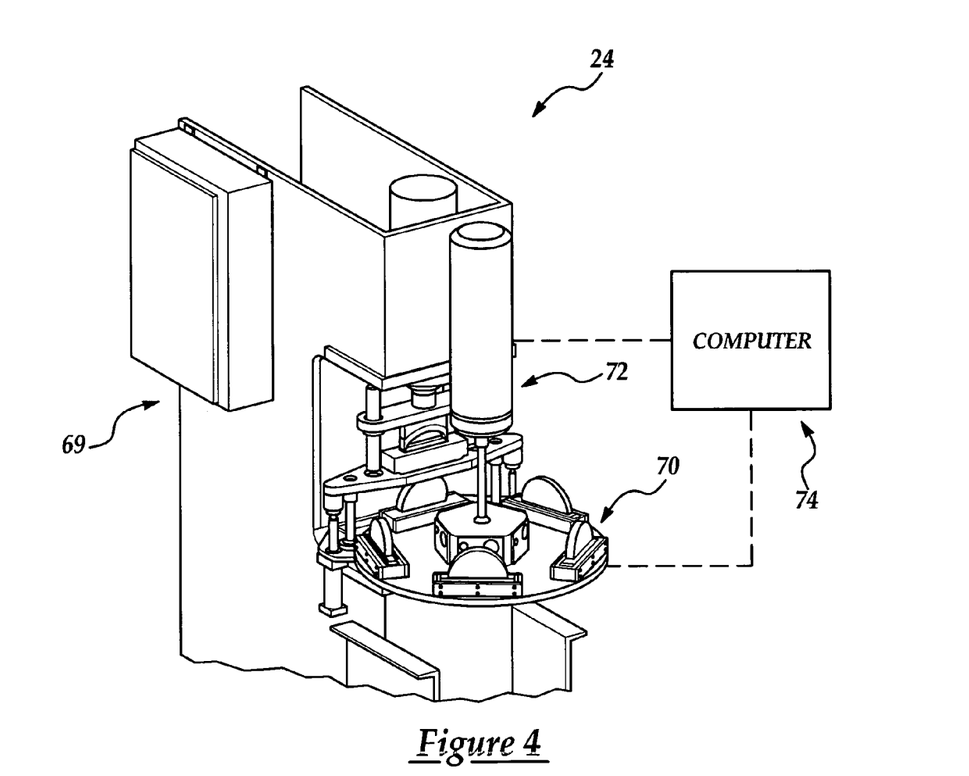
FIG. 4 is a perspective view of a moveable platform and a pressing station of the friction material application apparatus of FIG. 1.
Figure 5:
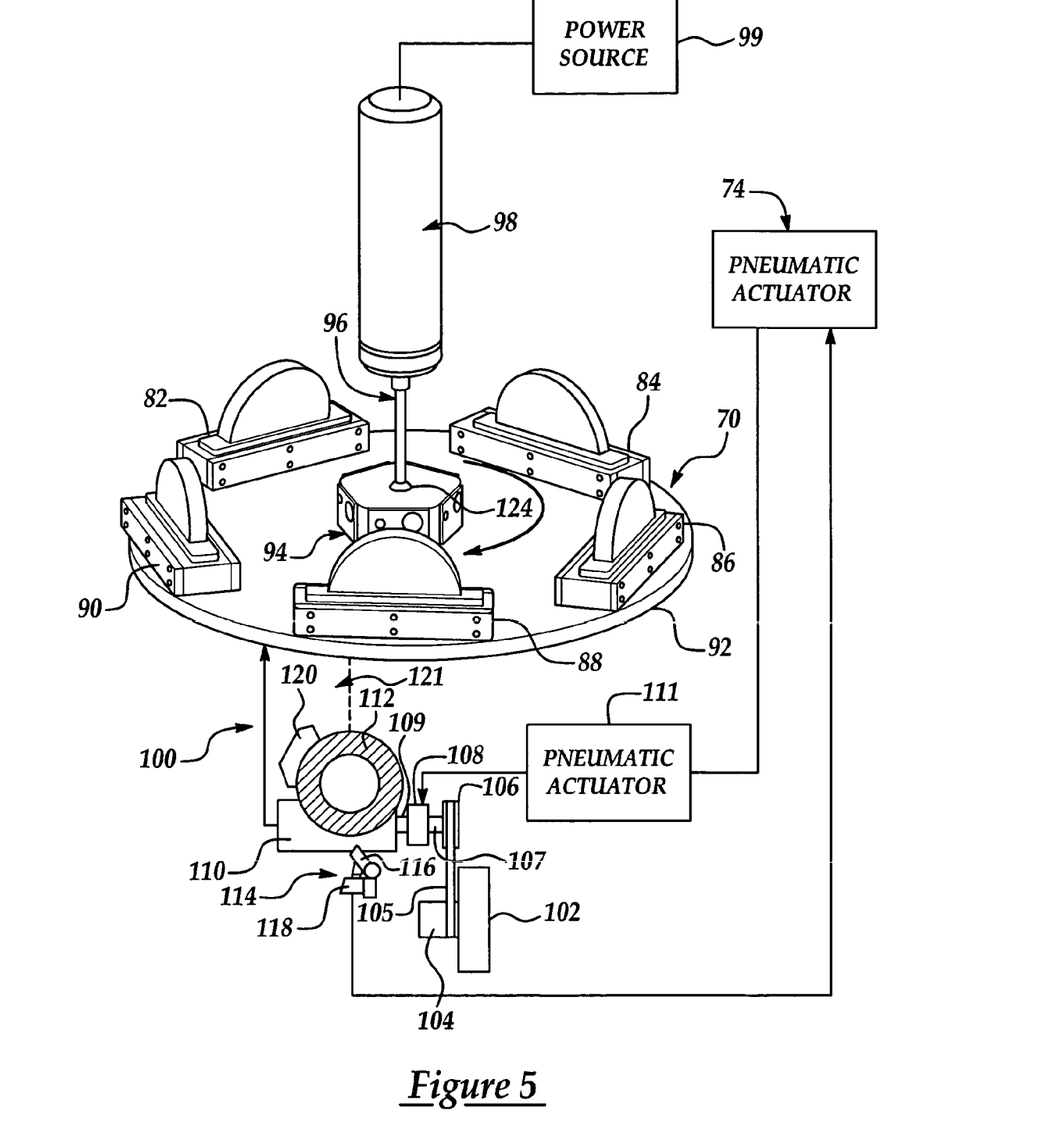
FIG. 5 is a perspective view of the moveable platform of FIG. 4.

Referring to FIGS. 2, 4 and 5, the friction material application apparatus 24 is provided to dispose the friction material or friction material member 34 onto the brake shoe carrier 30. The apparatus 24 includes a housing 69, a moveable platform 70, a pressing station 72, and a control computer 74.

Figure 7:
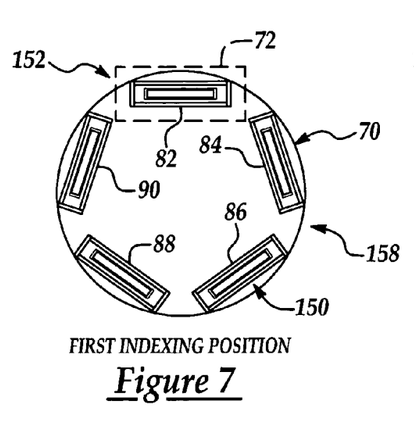
FIG. 7 is a top view of the moveable platform of FIG. 4 illustrating a first indexing position of the moveable platform.
Figure 8:
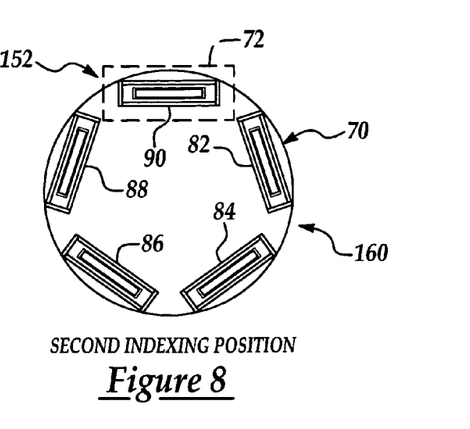
FIG. 8 is a top view of the moveable platform of FIG. 4 illustrating a second indexing position of the moveable platform.
Figure 9:
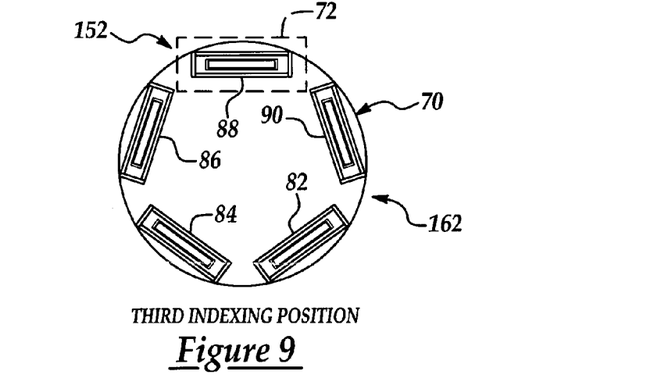
FIG. 9 is a top view of the moveable platform of FIG. 4 illustrating a third indexing position of the moveable platform.
Figure 10:
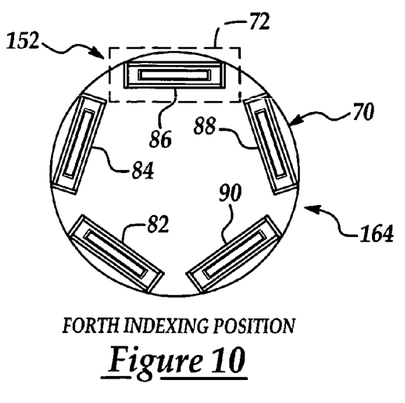
FIG. 10 is a top view of the moveable platform of FIG. 4 illustrating a fourth indexing position of the moveable platform.
Figure 11:
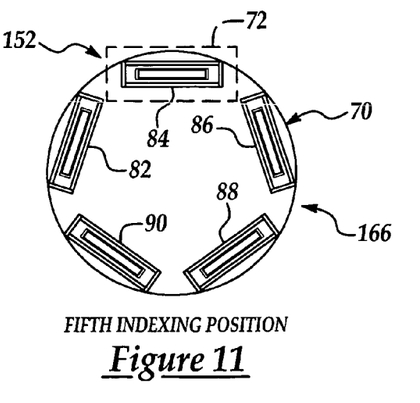
FIG. 11 is a top view of the moveable platform of FIG. 4 illustrating a fifth indexing position of the moveable platform.

Referring to FIGS. 5 and 7, the moveable platform 70 is provided to move the brake shoe carrier 30 from a load position 150 to an application position 152 proximate the pressing station 72 and thereafter to the position 150 for unloading the carrier 30. The moveable platform 70 includes holders 82, 84, 86, 88, 90, a plate 92, a coupling unit 94, a conduit 96, an electrical slip ring unit 98, a power source 99, and a platform advancement unit 100.

Referring to FIG. 5, the plate 92 is provided to support the holders 82, 84, 86, 88, 90. The plate 92 is substantially circular-shaped and is operably coupled to the platform advancement unit 100 that induces movement of the plate 92 to predetermined positions.

Figure 6:
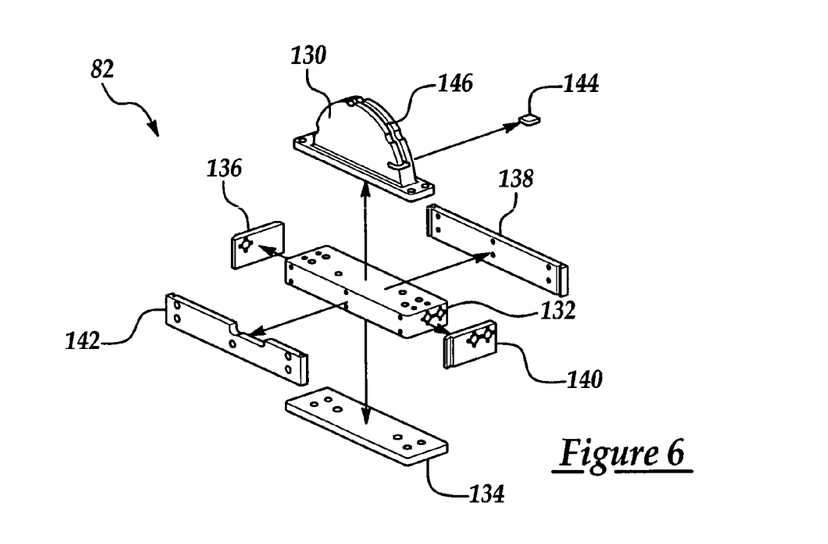
FIG. 6 is a perspective view of a holder utilized on the moveable platform of FIG. 5 for holding a brake shoe carrier.

Referring to FIGS. 5 and 6, the holders 82, 84, 86, 88, 90 are disposed on the plate 92 and are provided to support the brake shoe carriers 30 and to maintain each of the brake shoe carriers 30 at a desired orientation. Each of holders 82, 84, 86, 88, 90 includes a carrier support member 130, a heating platen 132, a base portion 134, insulating members 136, 138, 140, 142, and a carrier position reference member 144. The carrier support member 130 has a diameter substantially equal to the diameter of the carrier 30. The carrier support member 130 receives the brake shoe carrier 30 in a groove 146. The heating platen 132 includes resistance heating cartridges (not shown) disposed therein. The heating cartridges conduct heat through the heating platen 132 and through the carrier support member 130 to heat the brake shoe carrier 30 disposed on the carrier support member 130. The carriers are heated to a temperature between 80-200° F. to at least partially cure the adhesive material 32. Of course, the curing temperature could be greater than or less than aforementioned range depending in part upon the type of adhesive material 32 and the type of friction material 34. The carrier position reference member 144 provides a position indicator by which the brake shoe carriers 30 can be orientated during placement on the support member 130.

Referring to FIG. 5, the platform advancement system 100 is provided to control the indexing of the holders 82, 84, 86, 88, 90 to predetermined positions. The platform advancement system 100 includes a motor 102, a motor shaft 104, a belt 105, a pulley 106, a pulley shaft 107, a clutch member 108, a gearbox shaft 109, a gear box 110, a pneumatic actuator 111, a position wheel 112, a limit switch 114, and a position indicator member 120.

The belt 105 is operably coupled to the motor shaft 104 and to the pulley 106 wherein when the motor 102 rotates the motor shaft 104, the motor shaft 104 rotates both the pulley 106 and the pulley shaft 108. When the pneumatic clutch member 108 is in a first operating position, the pulley shaft 107 rotates the gearbox shaft 109. The gearbox shaft 109 is operably coupled to a series of gears inside the gear box 110 so that when the pneumatic clutch member 108 is in the first operating position, the motor 102 is in physical communication with the gears in the gearbox 110. The gears in the gearbox 110 are also operably coupled to a position wheel 112 and the moveable platform 70. The gearbox 110 is configured to rotate the position wheel 112 and the moveable platform 70 at proportional angular velocities so that as the position wheel 110 completes one revolution (i.e., 360 degrees of movement) the moveable platform 70 completes one-fifth of a revolution (i.e., 72 degrees of movement).

The limit switch 114 is provided to detect a position of the position wheel 112 corresponding to a set of five predetermined indexing positions on the moveable platform 70 and to transmit a signal indicative of the moveable platform 70 position to the computer 74. The limit switch 114 includes an arm member 116 and a contacting member 118. When a position indicating member 120 disposed on the position wheel 112 contacts the arm member 116, the arm member 116 moves from a first operating position to a second operating position. When the arm member 116 is in the second operating position, the arm member 116 ceases to contact the contacting member 118 thereby triggering the limit switch 114 to send a signal to the control computer 74. Thereafter, the control computer 74 transmits a signal to pneumatic actuator 111 to actuate the clutch member 108 from the first operating position to a second operating position. When the clutch member 108 is in the second operating position, the clutch member decouples the pulley shaft 107 from the gearbox shaft 109 that causes the platform 70 to stop at a predetermined rotational position. Further, the control computer 74 sends a signal to the pressing station 72 to begin a pressing operation. When the pressing station 72 completes the pressing operation, the control computer 74 sends a signal to the pneumatic actuator 111 to move the clutch member 108 from the second operating position to the first operating position to couple the pulley shaft 107 to the gearbox shaft 109 allowing the motor 102 to rotate both the moveable platform 72 and the position wheel 112. When the position indicating member 120 moves past the arm member 116 of the limit switch 114, the arm member 116 then returns to the first operating position.

The coupling unit 94 and the conduit 96 route electrical wires from a power source 99 to the motor 102 and to each heating platen 132 in the holders. The unit 94 is mounted near the center of the plate 92. The coupling unit 94 includes five outer walls, and a top wall. The conduit 96 extends through a hole 124 extending through the top wall of the unit 94 and is further operably coupled to the electrical slip ring unit 98. The electrical slip ring 98 provides a continuous electrical connection through brushes on stationary contacts from the power source 99 to the motor 102.

In the exemplary embodiment, the moveable platform 70 has a circular rotatable plate 92. In an alternate embodiment, the moveable platform 70 has a plate with a non-circular shape. In other alternate embodiments the moveable platform performs both pivoting movements and sliding movements to form a friction material around a brake shoe carrier. The type of movement that the moveable platform employs is understood not to be limiting on the scope of the invention. In the exemplary embodiment the moveable platform 70 heats the brake shoe carriers 30. However, in another alternate embodiment, the heating platens 134 disposed in the carriers could be removed.

Referring to FIGS. 7-11, a brief description of the indexing positions of the moveable platform 70 will be provided. In the exemplary embodiment, the moveable platform 70 moves each of the holders holding a brake shoe carrier 30 from the load position 150 to the application position 152. In particular, the moveable platform 70 sequentially indexes to each of five positions including: a first indexing position 158, a second indexing position 160, a third indexing position 162, a forth indexing position 164, and a fifth indexing position 166. Each of the indexing positions 158, 160, 162, 164, 166 corresponds to a platform position wherein each of the holders 82, 84, 86, 88, 90, respectively, are moved on to the application position 152 proximate the pressing station 72. The pressing station 72 sequentially disposes the friction material 34 on each brake shoe carrier.

When one of the holders 82, 84, 86, 88, 90 is positioned at the unload position 150, either an operator or an unloading device unloads the brake shoe carrier 30 having the friction material member 34 from the holder located at the unload position 150. A new brake shoe carrier 30 without the friction material member 34 is then loaded into the empty carrier at the position 150, which is also the unload position. In alternative embodiments, the unload position 150 could be at the same position as either the application position 152 or the load position.

In alternate embodiments of friction material application apparatus 24, the apparatus 24 can have less than five holders or greater then five holders. Further, it is contemplated that the loading and unloading of the brake shoe carriers 30 could occur at any one of the holders 82, 84, 86, 88, 90 located at any one of the indexing positions 158, 160, 162, 164, 166. It has been further contemplated that the brake shoe carriers 30 could be unloaded at one indexing position and loaded at a different indexing position. Although in the exemplary embodiment each indexing position is sequential and the moveable platform 70 indexes five times at seventy-two degree increments, it is contemplated that the moveable platform 70 might increment at varying rotational distances and can be programmed to skip holder positions. Thus, the particular operation of the indexing of the moveable platform 70 and the number of holders on the moveable platform, are not limiting on the scope of the invention.

Figure 12:
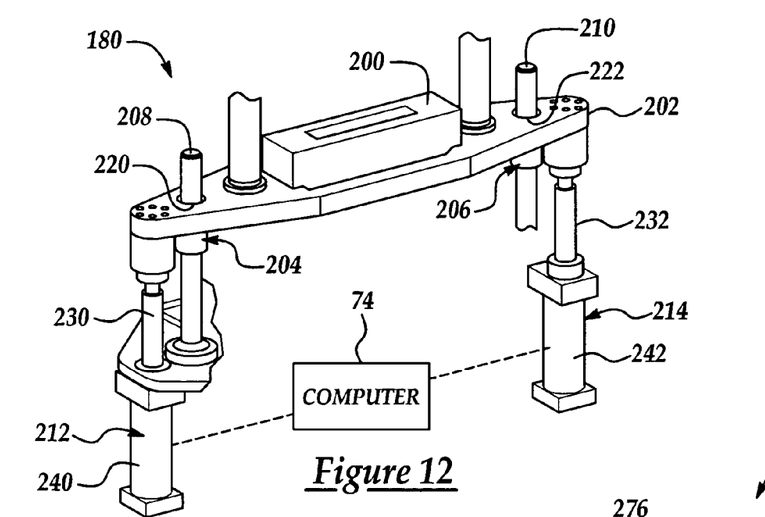
FIG. 12 is a perspective view of the mold assembly portion of the pressing station of FIG. 4.
Figure 13:
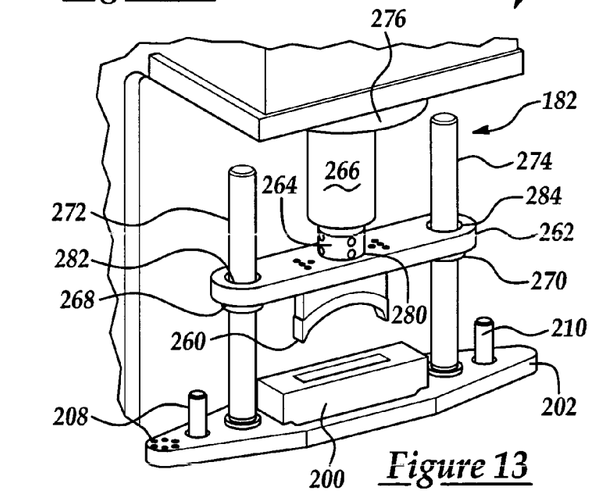
FIG. 13 is a perspective view of the punch assembly portion of the pressing station of FIG. 4.

Referring to FIGS. 12 and 13, the pressing station 72 is provided to dispose friction material member 34 onto each of the brake shoe carriers 30. The pressing station 72 includes a mold assembly 180 and a punch assembly 182.

The mold assembly 180 and the punch assembly 182 are provided to mold a friction material 34 into a predetermined shape about the brake shoe carrier 30. The mold assembly 182 includes a molding die 200, a plate 202, bushings 204, 206, guideposts 208, 210, and jacks 212, 214. The molding die defines a cavity that is configured to be disposed about the brake shoe carrier in order to define the area for application of the friction material.

The plate 202 is operably connected to guide posts 208, 210. The guideposts 208, 210 are provided to guide the plate 202, when the plate 202 travels between first and second operating positions. The plate 202 has outer holes 220, 222 extending therethrough. The bushings 204, 206 are received and held within the outer holes 220, 222 of the plate 202. The bushings 204, 206 operably connect the guideposts 208, 210 and the plate 202 to allow the plate 202 to move relative to the guideposts 208, 210. The jacks 212, 214 are provided to move the plate 202 between a first raised operating position for allowing a holder member to be rotated underneath the molding die 200 and a second lowered operating position moving the molding die 200 against the brake shoe carrier 30. The jacks 212, 214 included pistons 230, 232, respectively, and cylinders 240, 242, respectively. The pistons 230, 232 are attached to the plate 202 at opposite ends of the plate 202.

In a first operating position, the plate 202 and the molding die 200 are suspended above the brake shoe carrier 30 located in the application position 152. To lower the plate 202 and the molding die 200, the computer 74 induces a hydraulic valve (not shown) to open and to release pressurized fluid from the cylinders 240, 242. Thereafter, the pistons 230, 232 travel downwardly from the first operating position in which the pistons 230, 232 extend outside the cylinders 240, 242 to the second operating position in which each of the pistons 230, 232 recess inside the cylinders 240, 242, respectively. The guideposts 208, 210 assist in stabilizing the plate 202 when the plate 202 travels between the first and second operating positions. In the second operating position, the molding die 200 is positioned around the brake shoe carrier 30 in the application position 152 to dispose the friction material 34 on the adhesive 32 disposed on the brake shoe carrier 30.

Referring to FIG. 13, the punch assembly 182 includes a punch member 260, a punch plate 262, a ram coupler 264, a ram member 266, bushings 268, 270, guideposts 272, 274, and a ram cylinder 276.

The punch member 260 provides a concave surface on which the friction material member 34 is shaped. In particular, the concave surface has a diameter substantially equal to a diameter of an exterior surface of the finished brake shoe. The punch plate 262 has a hole 280 extending therethrough. The punch member 260 includes a screw portion that extends through the hole 280. The screw portion is fixedly attached to ram coupler 264 by threaded screw attachment. The screw attachment couples the punch member 260 and the punch plate 262 to the ram coupler 264. The punch plate 262 has holes 282, 284 extending therethrough located at the opposite ends. The bushings 268, 270 are received and held inside of the holes 282, 284, respectively. Further, the bushings 268, 270 are disposed between the punch plate 262 and the guideposts 272, 274, respectively, and allow the punch plate 262 to move upwardly and downwardly on the guideposts 272, 274.

During operation of the pressing station 72, the friction material is loaded into the molding die 200 when the molding die 200 is disposed proximate the brake shoe carrier 30. The friction material could be manually or automatically loaded into the molding die 200 as an extruded tape or a granular or particulate material. In accordance with an exemplary embodiment and if an extruded tape or portion of friction material is used punch member 260 can also be used to cut portions therefrom for insertion into the cavity of the molding die. Alternatively, a separate punch and conveyor may be used to provide portions of the friction material for insertion into the molding die cavity by the punch member. The control computer 74 induces a pump (not shown) to pressurize the ram cylinder 276 inducing the ram member 266 to move the punch assembly 182 from a first operating position to a second operating position. The punch member 260 contacts the friction material in the molding die 200 and disposes the friction material member 34 on the brake shoe carrier 30. The pump continues to pressurize the ram cylinder 276 forcing the punch member 260 downward against the friction material disposed on the carrier 30 to form the friction material member 34. A pressure sensor (not shown) in the cylinder 276 generates a pressure signal indicative of a pressure applied by the punch member 260, which is received by the control computer 74. When the pressure reaches a predetermined pressure, the control computer 74 modulates the pump to maintain the predetermined pressure on the punch member 260 for a predetermined time period. During the predetermined time period, the friction material is compressed against the adhesive material on the brake shoe carrier 30 to form friction material member 34. Further, the carrier is heated to a temperature in a range of 80-200° F. to at least partially cure the adhesive material 32 to bond the friction material member 34 to the brake shoe carrier 30. Thereafter, the control computer 72 induces the pump to depressurize the cylinder 276. When the cylinder 276 is depressurized, the punch 112 travels from the second operating position upwardly to the first operating position and discontinues contact with the friction material member 34, leaving the friction material member 34 disposed on the brake shoe carrier 30.

After the friction material member 34 has been formed on the brake shoe carrier 30, the moveable platform 70 indexes a holder of the carrier 30 to an unload position 150. Thereafter, an operator or an unloading device removes the brake shoe carrier 30 having the friction material member 34 disposed thereon from the moveable platform 70. Because the friction material member 34 is not cured while in the pressing station 72, the pressing station 72 is able to process the brake shoe carriers 30 faster than other processes in which the friction material on the brake shoe carriers are cured while in a pressing station.

As discussed herein and in accordance with exemplary embodiments of the present invention, the pressing process wherein the friction material is inserted into the mold or die cavity and adhered to the brake shoe carrier can be accomplished in less than 30 seconds and as little as a single second with the majority of the process being accomplished in less than 10 seconds as opposed to prior process which can take as long as 3 to 8 minutes or even longer to accomplish. Therefore, the method and apparatus of exemplary embodiments of the present invention allow for quicker manufacturing of the brake pads as the longer curing process is performed at a location remote from the pressing station. These faster or short cycle integrally molding processes are achieved in as little as a single second as the punch press provides the necessary pressure to form the friction material around the brake shoe carrier as well as the adhesive disposed between a surface of the friction material and a surface of the brake shoe carrier. Moreover, and if required, the holder disposed upon the rotatable platform provides the necessary heat source for partial curing of the adhesive and the friction material disposed thereon. In addition, and since this short cycle process only provides a partial curing of the friction material and the adhesive, the brake shoe carrier with the friction material disposed thereon is quickly formed and then removed to a remote station for curing in an oven thus, the short cycle process of exemplary environments of the present invention allows for faster production rates at significantly lower capital expenditures. Additionally, the heat source, if required, at this stage is only required to provide a temperature that is less than those required for complete curing of the friction material.

Thus faster forming times are accomplished by removing the step of curing, which requires longer time periods, to a station that is remote from the pressing, forming and initial curing process. In an exemplary embodiment, a short cycle process can be accomplished in as little as a single second whereas prior integrally molding processes were longer than 30 seconds and typically required several minutes since all curing occurred at the press. Moreover, the original systems are not easily adapted to design changes. For example, and in accordance with exemplary embodiment of the present invention and in order to use the short cycle process on a brake shoe of a different configuration the holders, the die cavity and the punch press merely need to be reconfigured to accommodate a different brake shoe design and the quick short cycle process of as little as one second can be achieved with a different design as the curing will occur at a remote location.

Figure 14:
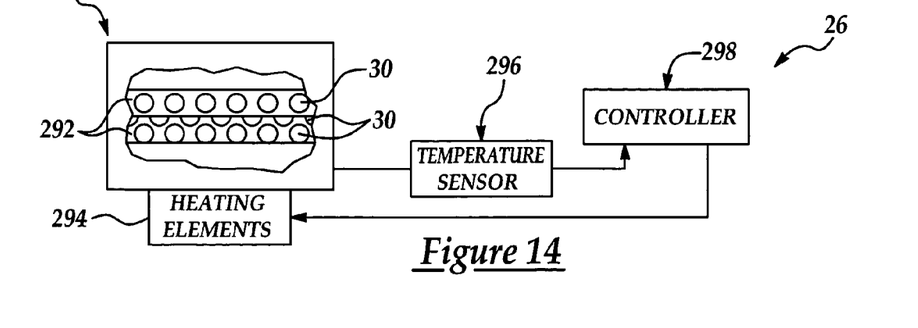
FIG. 14 is a block diagram of the heating station of FIG. 1.

Referring to FIG. 14, the heating station 26 is provided to substantially cure a plurality of friction material members 34 disposed on a plurality of brake shoe carriers. The heating station 26 includes a curing oven 290, racks 292, heating elements 294, a temperature sensor 296, and a controller 298. The racks 292 are provided to support the plurality of brake shoe carriers 30 disposed thereon. The heating elements 294 are provided to heat the curing oven 290 in response to a signal from the controller 298. The temperature sensor 296 generates a signal indicative of a temperature inside the curing oven 290, which is received by the controller 298. The controller 298 activates and deactivates the heating elements 294 in response to the temperature sensor signal. The heating elements 294 heat the plurality of brake shoe carriers 30 disposed on the racks to a predetermined temperature in a range of 200-350° F. for a predetermined time period such as three and one-half hours for example. Of course, the temperature and the curing time period could vary based on the type of friction material. The heating process cures the friction material members 34 thereby forming an integrally molded brake shoe 20. Accordingly, the curing process takes considerably longer and requires greater temperature ranges than those of the initial press and forming stage of the short cycle process of exemplary embodiments of the present invention.

Figure 15:
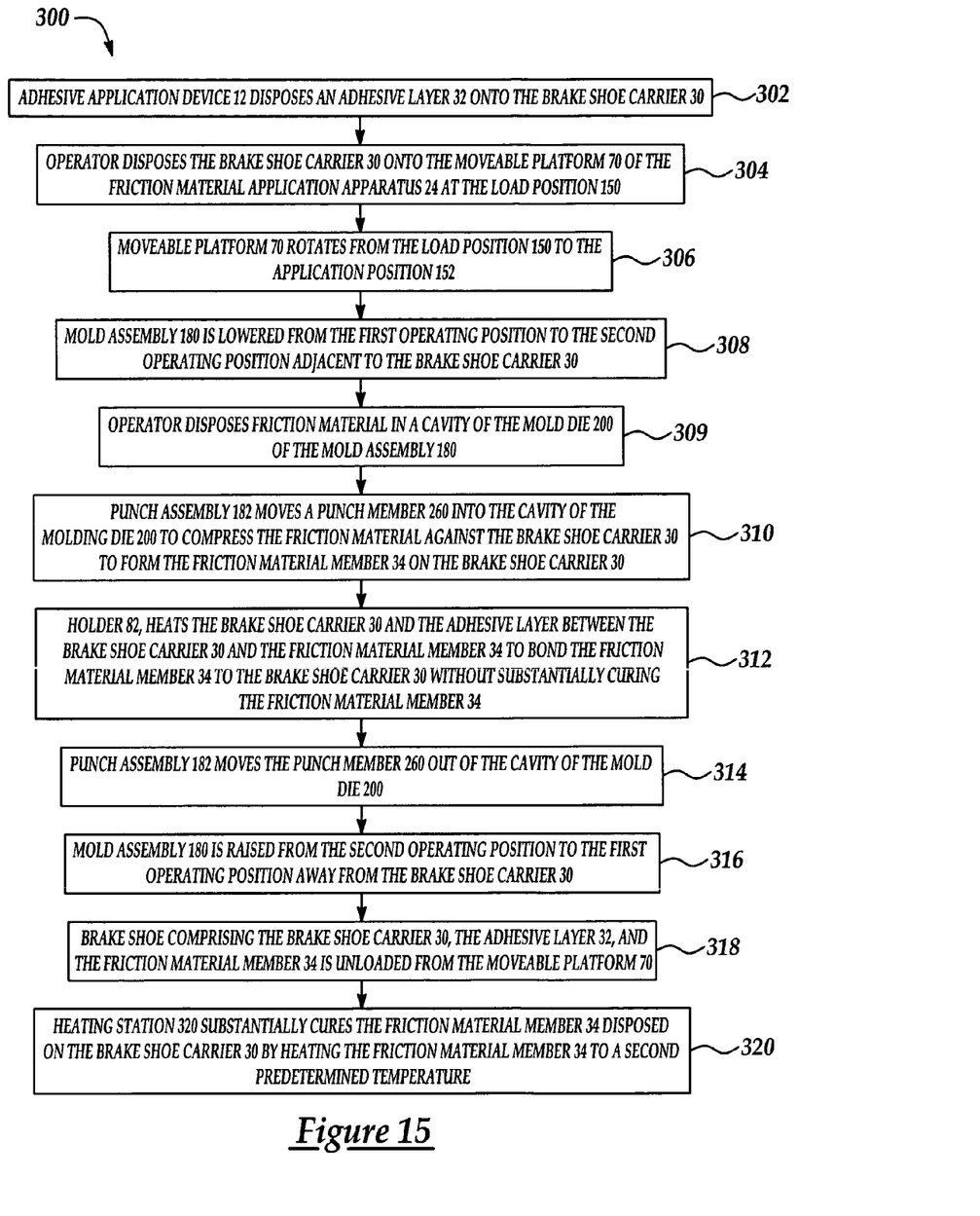
FIG. 15 is a flow chart of a method for manufacturing brake shoes in accordance with another exemplary embodiment.

Referring to FIG. 15, a method 300 for molding the friction material member 34 on the brake shoe carrier 30 will now be described. At step 302, the adhesive application device 12 disposes an adhesive layer 32 onto the brake shoe carrier 30.

At step 304, the operator disposes the brake shoe carrier 30 onto the moveable platform 70 of the friction material application apparatus 24 at the load position 150.

At step 306, the moveable platform 70 rotates from the load position 150 to the application position 152.

At step 308, the mold assembly 180 is lowered from the first operating position to the second operating position adjacent to the brake shoe carrier 30.

At step 309, an operator or automated equipment disposes friction material in a cavity of the mold die 200 of the mold assembly 180, which may be accomplished by loose fill or perform applications or any other equivalent means.

At step 310, the punch assembly 182 moves a punch member 260 into the cavity of the molding die 200 to compress the friction material against the brake shoe carrier 30 to form the friction material member 34 on the brake shoe carrier 30.

At step 312, the holder 82, heats the brake shoe carrier 30 and the adhesive layer between the brake shoe carrier 30 and the friction material member 34 to bond the friction material member 34 to the brake shoe carrier 30 without substantially curing the friction material member 34. During step 312, the adhesive layer is at least partially cured.

At step 314, the punch assembly 182 moves the punch member 260 out of the cavity of the mold die 200.

At step 316, the mold assembly 180 is raised from the second operating position to the first operating position away from the brake shoe carrier 30.

At step 318, the brake shoe comprising the brake shoe carrier 30, the adhesive layer 32, and the friction material member 34 is unloaded from the moveable platform 70.

At step 320, the heating station 320 substantially cures the friction material member 34 disposed on the brake shoe carrier 30 by heating the friction material member 34 to a second predetermined temperature.

A significant advantage of the method of manufacturing a brake shoe is that by curing the adhesive material member 34 and curing the friction material member at different locations, the manufacturing rate of brake shoes can be significantly increased as compared to other methods. In particular, large batches of brake shoes can be simultaneously heated in a curing oven to cure friction material members thereon, after an adhesive layer has been cured at the pressing station. Further, relatively large expensive pressing stations for simultaneously curing a plurality of friction members are not needed.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for manufacturing a brake shoe, comprising:
   disposing an adhesive layer on a surface of a brake shoe carrier;
   supporting the brake shoe carrier on a holder disposed opposite the adhesive layer;
   disposing a friction material against the adhesive layer;
   heating the adhesive layer and the friction material to a first predetermined temperature;
   using a first device to bond the friction material to the brake shoe carrier without substantially curing the friction material; and
   substantially curing the friction material by heating the friction material member to a second predetermined temperature using a second device remote from the first device to form the brake shoe, wherein the holder includes a convex surface configured to matingly engage a concave surface of the brake shoe carrier, the holder including a groove formed through the convex surface configured to engage a projection of the brake shoe carrier, the holder being in thermal communication with a heater to provide heating to the adhesive layer and the friction material to the first predetermined temperature.

2. The method of claim 1, wherein the first device comprises a pressing station configured to form the friction material on the brake shoe carrier without providing a source of heat and the brake shoe carrier is received within the holder disposed on a movable platform configured to position the holder and the brake shoe carrier below the first device.

3. The method of claim 2, wherein the first device bonds the friction material to the brake shoe carrier without substantially curing the friction material in less than 10 seconds.

4. The method of claim 1, wherein the second device comprises a curing oven and the brake shoe is a drum brake shoe.

5. The method of claim 4, wherein the first predetermined temperature is between 80-200 degrees Fahrenheit.

6. The method of claim 5, wherein the second predetermined temperature is greater than 200 degrees Fahrenheit.

7. The method of claim 6, wherein the step of moving the friction material against the adhesive layer on the brake shoe carrier further comprises compressing friction material particles against the adhesive layer on the brake shoe carrier to form the friction material over the adhesive layer and the first device comprises a pressing station configured to form the friction material on the brake shoe carrier without providing a source of heat and the brake shoe carrier is received within the holder disposed on a movable platform configured to position the holder and the brake shoe carrier below the first device.

8. The method of claim 1, wherein the first predetermined temperature is between 80-200 degrees Fahrenheit and the second predetermined temperature is greater than 200 degrees Fahrenheit and the first device bonds the friction material to the brake shoe carrier without substantially curing the friction material in less than 10 seconds.

9. The method of claim 1, wherein the friction material has a rubber content of at least five percent of a total mass of the friction material.

10. The method of claim 1, wherein the friction material has a resin content of at least three percent of a total mass of the friction material and the brake shoe carrier is constructed from steel.

11. The method of claim 1, further comprising the step of placing a die box around the holder to form a mold cavity for shaping the friction material during bonding of the friction material to the brake shoe carrier, the mold cavity being configured to receive a punch having a concave surface corresponding to a convex surface of the brake shoe carrier.

12. The method of claim 11, wherein after entering the die box the mold punch applies a force against the friction material to form the friction material about the convex surface of the brake shoe carrier and bond the friction material to the brake shoe carrier.

13. The method of claim 12, wherein the friction material is placed into the die box after placement of the die box about the holder, and wherein the friction material is formed through an extruding process and is cut into individual members by interaction of the punch with the die box.

14. The method of claim 13, wherein disposing of the adhesive layer onto the brake shoe carrier is performed through an adhesive material application device, the adhesive material application device including an automated roller adapted to apply the adhesive to the convex surface of the brake shoe carrier prior to placement of the friction material onto the adhesive.

15. The method of claim 14, further comprising the step of cleaning the brake shoe carrier prior to disposing of the adhesive layer onto the brake show carrier, the cleaning of the brake shoe carrier comprising shot-blasting material against the brake shoe carrier.

16. The method of claim 15, wherein the holder and heater are disposed on a moveable platform configured to rotate about an axis to bring the holder in proximity to the die box and punch.

17. The method of claim 16, wherein a plurality of holders and heaters are disposed on to the moveable platform configured to bring each of the plurality of holders in proximity to the die box and the punch, each of the plurality of holders supporting a brake shoe carrier having an adhesive disposed thereon for attachment of a friction material to the brake shoe carrier through the die box and the punch.

* * * * *